June 10, 1924.  1,497,511
J. JANATSCH
FORM AND EJECTING MEANS FOR ICE CREAM BOXES
Filed March 20, 1923
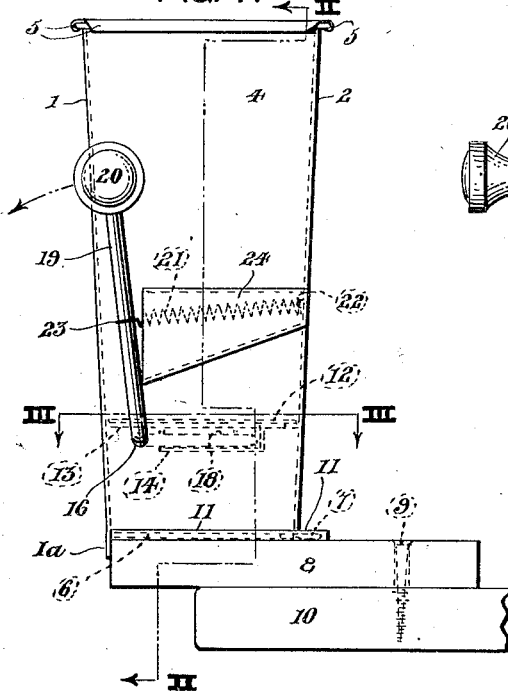
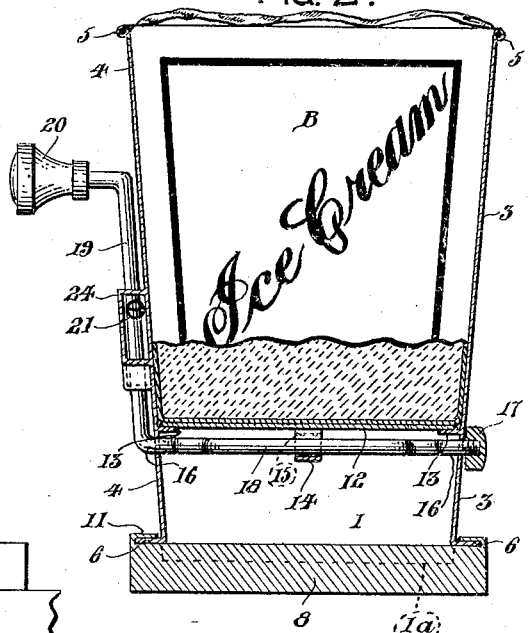
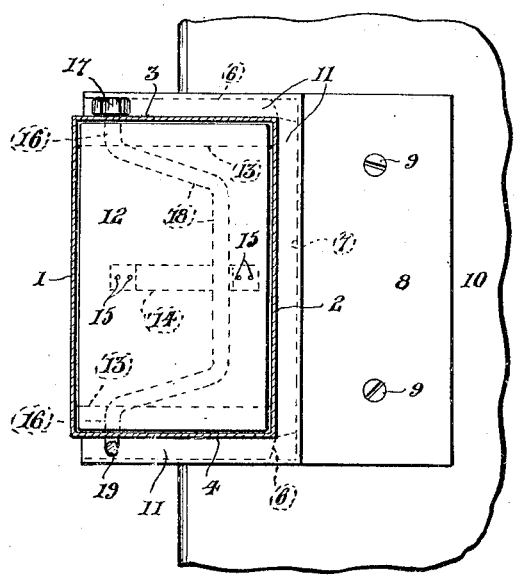
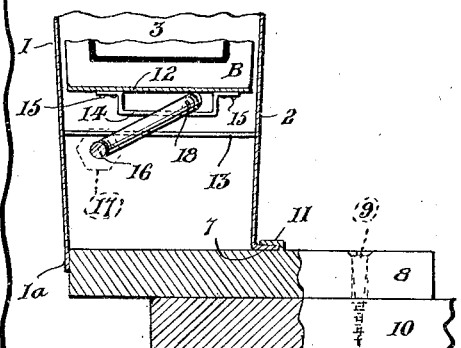
Inventor
Joseph Janatsch
By F. E. Bryant,
Attorney.

Patented June 10, 1924.

1,497,511

UNITED STATES PATENT OFFICE.

JOSEPH JANATSCH, OF TRENTON, NEW JERSEY.

FORM AND EJECTING MEANS FOR ICE-CREAM BOXES.

Application filed March 20, 1923. Serial No. 626,414.

*To all whom it may concern:*

Be it known that I, JOSEPH JANATSCH, a citizen of the United States of America, residing at Trenton, in the county of Mercer and State of New Jersey, have invented certain new and useful Improvements in Forms and Ejecting Means for Ice-Cream Boxes, of which the following is a specification.

This invention relates to certain new and useful improvements in a form and ejecting means for ice cream boxes wherein a card board or paper box placed in a metallic form as a bracing means during the filling of the box with ice cream has ejecting means for removing the box from the form.

A further object of the invention is to provide in connection with a form and ejecting means for ice cream boxes, a base support upon which forms of different sizes such as pint or quart container may be mounted, a single base support accommodating the mounting of different sized forms during the filling of an ice cream box.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a form and ejecting means for ice cream boxes, the same being illustrated as removably mounted upon a rigid support therefor, Figure 2 is a vertical sectional view taken on line II—II of Fig. 1 showing the ice cream box supported on a false bottom in the form and the separable connections between the form and base support.

Figure 3 is a horizontal sectional view taken on line III—III of Fig. 1 showing the crank arm for elevating the false bottom of the form, and Figure 4 is a fragmentary detail sectional view showing the false bottom elevated.

In the filling of ice cream boxes, wherein tapering paste board boxes are used, a metallic form is generally employed for housing the tapered container to act as a brace for the side walls thereof during the filling of the box, these metallic forms being open at their lower tapered ends permitting access to the bottom of the ice cream box for the application of pressure to eject the box from the form. In many instances, the paper box adheres to the side walls of the form and if a handle string on the box is employed to remove the box from the form, the string is generally broken, and quite frequently injury results to the box. It is therefore the primary object of this invention to provide efficient ejecting means for the ice cream box from a metallic form after having been thoroughly packed therein, the box being easily and quickly removed from the form without in any manner being injured.

Referring more in detail to the accompanying drawing, there is illustrated a form and ejecting means for ice cream boxes, the form including a metallic casing of the usual design that tapers downwardly toward the lower end thereof and includes front and rear walls 1 and 2 respectively, and end walls 3 and 4, the upper ends thereof being reinforced by a bead 5. To provide for the removable mounting of the form upon a rigid support, the lower ends of the side walls 3 and 4 carry outwardly directed flanges 6, while a similar flange 7 is carried by the lower edge of the rear wall 2, a depending alined extension 1$^a$ being carried by the front wall 1 as shown in Fig. 4. The support for the form includes a slot 8 rigidly mounted as at 9 upon a support 10, the upper face of the slot at the forward end thereof being provided with a U-shaped upstanding guide flange 11 beneath which the flanges 6 and 7 are received as clearly illustrated, the lower extension 1$^a$ upon the front wall 1 of the form engaging the forward edge of the block 8 as shown in Figs. 1 and 4 with the form rigidly supported upon the block. It is to be noted that forms of different sizes, such as pint and quart containers are provided with flange extensions upon the lower ends thereof to accommodate the mounting of forms of different sizes upon a single supporting block 8.

The ejecting means for the ice cream box include a false bottom 12 normally resting at opposite ends thereof upon cleats 13 carried by the end walls 3 and 4 of the form as clearly shown in Fig. 2, a U-shaped strap 14 depending from the lower side of the false bottom 12 and being secured thereto as at 15. A shaft 16 is journaled in the end walls 3 and 4 beneath the ledges 13, one projecting end thereof being provided with a retaining nut 17 while the intermediate crank portion 18 of the shaft being disposed within the strap 14 as clearly shown in Figs. 2 and 4. The other end of the shaft 16 projecting through the end wall 4 is bent upwardly at right angles to provide an operating handle 19 for the shaft 16 and having a hand grip 20 upon the upper end thereof. To place the shaft 16 under tension and for retaining the false bottom 12 in engagement with the supporting ledges 13, a coil spring 21 anchored at one end as at 22 adjacent the rear wall 2 of the form is disposed outwardly of the end wall 4 as shown in Fig. 1 with the opposite end of the spring anchored as at 23 to the operating handle 19, the spring being covered by the housing 24.

In the use of the device, a paper box B to be filled with ice cream is placed in the upper end of the form with the lower end of the box supported upon the false bottom 12 while the side walls of the box engage the inner faces of the side and end walls of the form as shown in Fig. 2. Ice cream is then packed into the box and the cover flaps therefor may be closed while the box is in the form. In removing the box from the form, the handle 20 is shifted against the tension of the spring 21 to cause the crank portion 18 of the shaft 16 to elevate the false bottom 12 as shown in Fig. 4, the false bottom flatly engaging the lower end of the box B over the entire surface thereof to eject the box from the form without in any manner damaging the same. When the box is removed, and pressure relieved on the handle 19, the spring 21 will restore the false bottom 12 to its seating position upon the supporting ledges 13 with the handle 19 assuming the position shown in Fig. 1. As above stated, the form is readily removable from the block 8 and forms of different sizes, such as pints and quarts or the like may be readily substituted therefor and mounted upon a universal support.

While there is herein shown and described the preferred embodiment of the present invention, it is nevertheless to be understood that minor changes may be made therein without departing from the spirit and scope of the invention as claimed.

What is claimed as new is:—

1. In an ice cream form for supporting a paper container while being filled with ice cream, a metallic form, ejecting means for a paper container carried thereby and including a false bottom for the form, a shaft journaled transversely of the form and having a crank portion engaging the false bottom to elevate the same, means for operating the shaft, means for automatically returning all movable parts to their normal positions after operation, and a strap depending from the false bottom inclosing the crank portion of the shaft.

2. In an ice cream form for supporting a paper container while being filled with ice cream, a metallic form, ejecting means for a paper container carried thereby and including a false bottom for the form, a shaft journaled transversely of the form and having a crank portion engaging the false bottom to elevate the same, means for operating the shaft, resilient means for automatically returning all movable parts to their normal positions after operation, a casing for enclosing said resilient means, a strap depending from the false bottom inclosing the crank portion of the shaft and supporting ledges carried by the form for the false bottom when the latter is in its lowest position.

3. In an ice cream form for supporting a paper container while being filled with ice cream, a metallic form, ejecting means for a paper container carried thereby and including a false bottom for the form, a shaft journaled transversely of the form and having a crank portion engaging the false bottom to elevate the same, means for operating the shaft, a strap depending from the false bottom inclosing the crank portion of the shaft, and a spring associated with the ejecting means for normally holding the false bottom in its lowered position.

4. In an ice cream form for supporting a paper container while being filled with ice cream, a rigid base block, a three sided holding flange carried by said block and cooperating therewith to form a socket, a metallic form having an outwardly projecting flange carried by three sides and a depending flange carried by the fourth side, said outwardly projecting flange being receivable in the socket carried by said base block for holding the form thereagainst and said depending flange being adapted to engage one edge of said base block for limiting the inward movement of said form carried flange into the socket, and an ejecting means carried by said form.

In testimony whereof I affix my signature.

JOSEPH JANATSCH.